United States Patent
Alarcon et al.

(10) Patent No.: US 12,433,344 B2
(45) Date of Patent: Oct. 7, 2025

(54) CONTROLLING AN OPERATION OF AN ELECTRONIC CIGARETTE

(71) Applicant: Fontem Ventures B.V., Amsterdam (NL)

(72) Inventors: Ramon Alarcon, Los Gatos, CA (US); Adam Hoffman, Campbell, CA (US); James R. Conrey, San Jose, CA (US)

(73) Assignee: Fontem Ventures B.V., Amsterdam (NL)

( * ) Notice: Subject to any disclaimer, the term of this patent is extended or adjusted under 35 U.S.C. 154(b) by 353 days.

(21) Appl. No.: 17/475,602

(22) Filed: Sep. 15, 2021

(65) Prior Publication Data
US 2022/0079243 A1 Mar. 17, 2022

Related U.S. Application Data

(63) Continuation of application No. 15/219,215, filed on Jul. 25, 2016, now Pat. No. 11,147,315.

(51) Int. Cl.
| | |
|---|---|
| *A24F 40/53* | (2020.01) |
| *A24F 40/50* | (2020.01) |
| *G01F 9/00* | (2006.01) |
| *G05D 23/19* | (2006.01) |
| *A24F 40/10* | (2020.01) |
| *G01F 23/80* | (2022.01) |

(52) U.S. Cl.
CPC .............. *A24F 40/53* (2020.01); *A24F 40/50* (2020.01); *G01F 9/001* (2013.01); *G05D 23/1924* (2013.01); *G05D 23/1927* (2013.01); *A24F 40/10* (2020.01); *G01F 23/804* (2022.01)

(58) Field of Classification Search
CPC .......... A24F 40/50; A24F 40/51; A24F 40/53; A24F 40/57; A24F 40/00–95
See application file for complete search history.

(56) References Cited

U.S. PATENT DOCUMENTS

| | | | |
|---|---|---|---|
| 5,505,214 | A | 4/1996 | Collins et al. |
| 9,072,321 | B2 | 7/2015 | Liu |
| 2013/0192615 | A1 | 8/2013 | Tucker et al. |
| 2013/0199528 | A1 | 8/2013 | Goodman et al. |

(Continued)

FOREIGN PATENT DOCUMENTS

| | | |
|---|---|---|
| CN | 103338664 A | 10/2013 |
| CN | 103501847 A | 1/2014 |

(Continued)

*Primary Examiner* — Sang Y Paik
*Assistant Examiner* — Bonita Khlok
(74) *Attorney, Agent, or Firm* — Dykema Gossett PLLC

(57) ABSTRACT

In accordance with one aspect of the present invention there is provided a method for controlling an operation of an electronic cigarette. The method can include determining a total amount of vaporization energy required to vaporize an amount of liquid stored in a reservoir of an electronic cigarette. The method can include determining a total amount of atomizer power that is delivered to an atomizer associated with the electronic cigarette over a period of time. The method can include determining an amount of liquid remaining in the reservoir of the electronic cigarette, based on a comparison between the total amount of vaporization energy and the total amount of atomizer power delivered to the atomizer over the period of time.

10 Claims, 4 Drawing Sheets

(56) References Cited

U.S. PATENT DOCUMENTS

| | | |
|---|---|---|
| 2013/0319435 A1 | 12/2013 | Flick |
| 2013/0319440 A1 | 12/2013 | Capuano |
| 2014/0020693 A1* | 1/2014 | Cochand .............. A61M 11/041 |
| | | 131/273 |
| 2014/0096781 A1 | 4/2014 | Sears et al. |
| 2014/0096782 A1 | 4/2014 | Ampolini et al. |
| 2014/0202474 A1 | 7/2014 | Peleg et al. |
| 2014/0270727 A1 | 9/2014 | Ampolini et al. |
| 2014/0299138 A1 | 10/2014 | Xiang |
| 2014/0321837 A1 | 10/2014 | Flick |
| 2014/0338685 A1 | 11/2014 | Amir |
| 2014/0345606 A1 | 11/2014 | Talon |
| 2014/0345633 A1 | 11/2014 | Talon et al. |
| 2015/0230521 A1 | 8/2015 | Talon |
| 2015/0237916 A1 | 8/2015 | Farine et al. |
| 2015/0237917 A1 | 8/2015 | Lord |
| 2015/0282527 A1 | 10/2015 | Henry, Jr. |
| 2015/0320116 A1* | 11/2015 | Bleloch ................ A24F 40/44 |
| | | 219/628 |
| 2015/0359263 A1* | 12/2015 | Bellinger ............ H05B 1/0244 |
| | | 392/394 |
| 2016/0057811 A1 | 2/2016 | Alarcon et al. |
| 2016/0143361 A1 | 5/2016 | Juster et al. |
| 2016/0255878 A1 | 9/2016 | Huang et al. |
| 2016/0325055 A1 | 11/2016 | Cameron |
| 2016/0360786 A1 | 12/2016 | Bellinger et al. |
| 2017/0095000 A1* | 4/2017 | Spirito ................... A24F 40/70 |
| 2017/0135405 A1* | 5/2017 | Reevell .................... H01C 7/06 |
| 2017/0245551 A1 | 8/2017 | Reevell |

FOREIGN PATENT DOCUMENTS

| | | |
|---|---|---|
| CN | 104010530 A | 8/2014 |
| CN | 104812260 A | 7/2015 |
| CN | 204579886 U | 8/2015 |
| CN | 104937399 A | 9/2015 |
| CN | 105208884 A | 12/2015 |
| CN | 105446393 A | 3/2016 |
| CN | 105452977 A | 3/2016 |
| CN | 105473011 A | 4/2016 |
| EP | 2399636 A1 | 12/2011 |
| WO | 2014203083 A2 | 12/2014 |
| WO | 2014205263 A1 | 12/2014 |
| WO | 2015151053 A2 | 10/2015 |
| WO | 2015165747 A1 | 11/2015 |
| WO | 2015189556 A1 | 12/2015 |
| WO | 2016091658 A1 | 6/2016 |

* cited by examiner

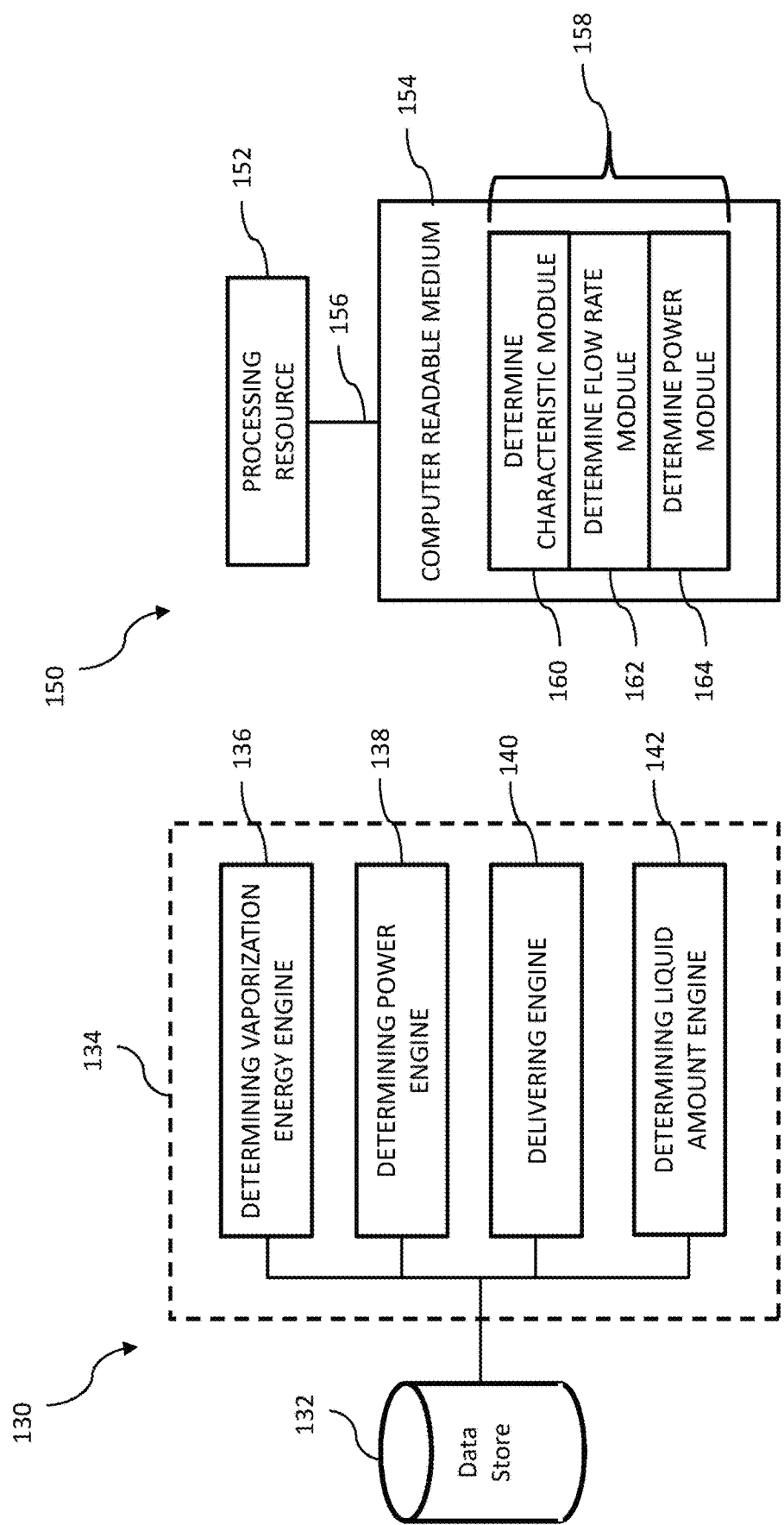

CONTROLLING AN OPERATION OF AN ELECTRONIC CIGARETTE

CROSS-REFERENCE TO RELATED APPLICATIONS

This application is a continuation of U.S. application Ser. No. 15/219,215, filed 25 Jul. 2016, now U.S. Pat. No. 11,147,315, which is hereby incorporated by reference as though fully set forth herein.

FIELD OF INVENTION

The present invention relates generally to electronic smoking devices and in particular electronic cigarettes.

BACKGROUND OF THE INVENTION

An electronic smoking device, such as an electronic cigarette (e-cigarette), typically has a housing accommodating an electric power source (e.g., a single use or rechargeable battery, electrical plug, or other power source), and an electrically operable atomizer. The atomizer vaporizes or atomizes liquid supplied from a reservoir and provides vaporized or atomized liquid as an aerosol. Control electronics control the activation of the atomizer. In some electronic cigarettes, an airflow sensor is provided within the electronic smoking device, which detects a user puffing on the device (e.g., by sensing an under-pressure or an airflow pattern through the device). The airflow sensor indicates or signals the puff to the control electronics to power up the device and generate vapor. In other e-cigarettes, a switch is used to power up the e-cigarette to generate a puff of vapor.

SUMMARY OF THE INVENTION

In accordance with one aspect of the present invention there is provided a non-transitory computer readable medium comprising computer executable instructions for controlling an atomizer of an electronic cigarette. The instructions can be executed to determine a characteristic associated with the electronic cigarette based on data stored on a memory of a reservoir portion of the e-cigarette. In various embodiments, the instructions can be executed to determine a flow rate of air provided to the atomizer, based on a signal received from a mass airflow sensor. In various embodiments, the instructions can be executed to determine an amount of power to deliver to the atomizer, based on the characteristic and the flow rate of air.

In accordance with one aspect of the present invention there is provided a method for controlling an operation of an electronic cigarette. The method can include determining a total amount of vaporization energy required to vaporize an amount of liquid stored in a reservoir of an electronic cigarette. The method can include determining a total amount of atomizer power that is delivered to an atomizer associated with the electronic cigarette over a period of time. The method can include determining an amount of liquid remaining in the reservoir of the electronic cigarette, based on a comparison between the total amount of vaporization energy and the total amount of atomizer power delivered to the atomizer over the period of time.

In accordance with one aspect of the present invention there is provided a system for controlling an operation of an electronic cigarette. The system can include a processor and a non-transitory computer readable medium comprising computer executable instructions, the instructions executable by the processor. The instructions can be executed to determine a total amount of vaporization energy required to vaporize an amount of liquid stored in a reservoir of an electronic cigarette. The instructions can be executed to determine an amount of power to deliver to an atomizer of the electronic cigarette based on received data. The instructions can be executed to cause the determined amount of power to be delivered to the atomizer. The instructions can be executed to determine an amount of liquid remaining in the reservoir of the electronic cigarette, based on a comparison between the total amount of vaporization energy and the total amount of power delivered to the atomizer over a particular period of time.

The characteristics, features and advantages of this invention and the manner in which they are obtained as described above, will become more apparent and be more clearly understood in connection with the following description of exemplary embodiments, which are explained with reference to the accompanying drawings.

BRIEF DESCRIPTION OF THE DRAWINGS

In the drawings, the same element numbers indicate the same elements in each of the views:

FIG. 4A is a diagram of a system for controlling an operation of an exemplary e-cigarette.

FIG. 4B is a diagram of a computing device for controlling an operation of an e-cigarette.

DESCRIPTION OF THE PREFERRED EMBODIMENTS

Figure 1:
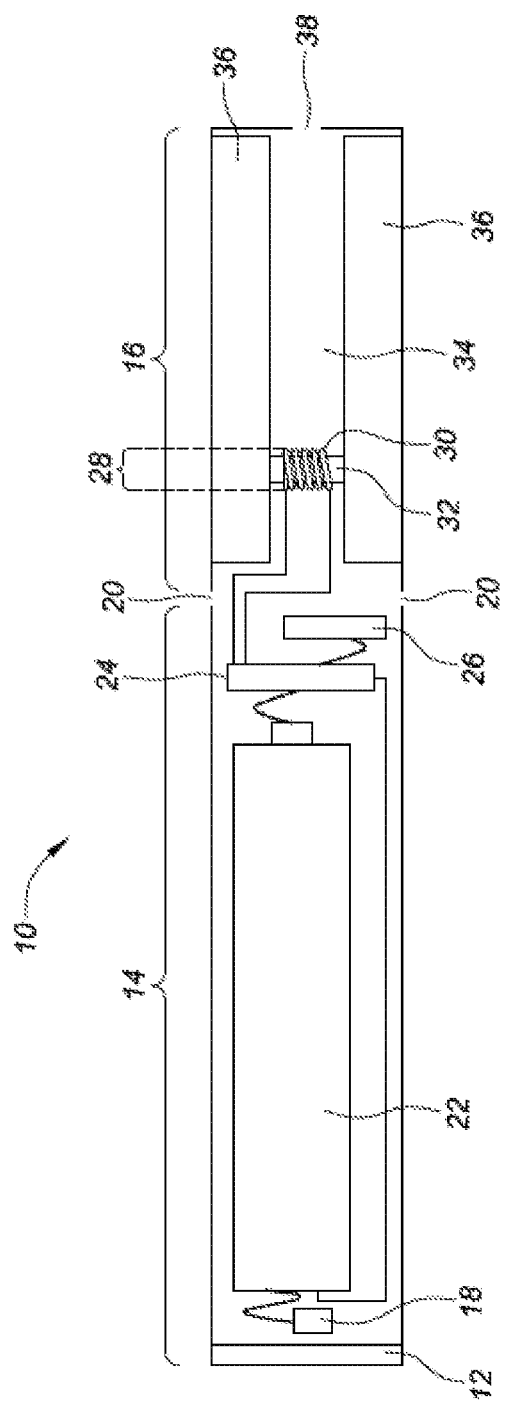
FIG. 1 is a schematic cross-sectional illustration of an exemplary e-cigarette.

Throughout the following, an electronic smoking device will be exemplarily described with reference to an e-cigarette. As is shown in FIG. 1, an e-cigarette 10 typically has a housing comprising a cylindrical hollow tube having an end cap 12. The cylindrical hollow tube may be a single-piece or a multiple-piece tube. In FIG. 1, the cylindrical hollow tube is shown as a two-piece structure having a power supply portion 14 and an atomizer/liquid reservoir portion 16. Together the power supply portion 14 and the atomizer/liquid reservoir portion 16 form a cylindrical tube which can be approximately the same size and shape as a conventional cigarette, typically about 100 mm with a 7.5 mm diameter, although lengths may range from 70 to 150 or 180 mm, and diameters from 5 to 28 mm.

The power supply portion 14 and atomizer/liquid reservoir portion 16 are typically made of metal (e.g., steel or aluminum, or of hardwearing plastic) and act together with the end cap 12 to provide a housing to contain the components of the e-cigarette 10. The power supply portion 14 and the atomizer/liquid reservoir portion 16 may be configured to fit together by, for example, a friction push fit, a snap fit, a bayonet attachment, a magnetic fit, or screw threads. The end cap 12 is provided at the front end of the power supply portion 14. The end cap 12 may be made from translucent plastic or other translucent material to allow a light-emitting diode (LED) 18 positioned near the end cap to emit light through the end cap. Alternatively, the end cap may be made of metal or other materials that do not allow light to pass.

An air inlet may be provided in the end cap, at the edge of the inlet next to the cylindrical hollow tube, anywhere along the length of the cylindrical hollow tube, or at the connection of the power supply portion 14 and the atomizer/liquid reservoir portion 16. FIG. 1 shows a pair of air inlets 20 provided at the intersection between the power supply portion 14 and the atomizer/liquid reservoir portion 16.

A power supply, preferably a battery 22, the LED 18, control electronics 24 and, optionally, an airflow sensor 26 are provided within the cylindrical hollow tube power supply portion 14. The battery 22 is electrically connected to the control electronics 24, which are electrically connected to the LED 18 and the airflow sensor 26. In this example, the LED 18 is at the front end of the power supply portion 14, adjacent to the end cap 12; and the control electronics 24 and airflow sensor 26 are provided in the central cavity at the other end of the battery 22 adjacent the atomizer/liquid reservoir portion 16.

The airflow sensor 26 acts as a puff detector, detecting a user puffing or sucking on the atomizer/liquid reservoir portion 16 of the e-cigarette 10. The airflow sensor 26 can be any suitable sensor for detecting changes in airflow or air pressure, such as a microphone switch including a deformable membrane which is caused to move by variations in air pressure. Alternatively, the sensor may be, for example, a Hall element or an electro-mechanical sensor.

The control electronics 24 are also connected to an atomizer 28. In the example shown, the atomizer 28 includes a heating coil 30 which is wrapped around a wick 32 extending across a central passage 34 of the atomizer/liquid reservoir portion 16. The central passage 34 may, for example, be defined by one or more walls of the liquid reservoir and/or one or more walls of the atomizer/liquid reservoir portion 16 of the e-cigarette 10. The coil 30 may be positioned anywhere in the atomizer 28 and may be transverse or parallel to a longitudinal axis of a cylindrical liquid reservoir 36. The wick 32 and heating coil 30 do not completely block the central passage 34. Rather an air gap is provided on either side of the heating coil 30 enabling air to flow past the heating coil 30 and the wick 32. The atomizer may alternatively use other forms of heating elements, such as ceramic heaters, or fiber or mesh material heaters. Nonresistance heating elements such as sonic, piezo, and jet spray may also be used in the atomizer in place of the heating coil.

The central passage 34 is surrounded by the cylindrical liquid reservoir 36 with the ends of the wick 32 abutting or extending into the liquid reservoir 36. The wick 32 may be a porous material such as a bundle of fiberglass fibers or cotton or bamboo yarn, with liquid in the liquid reservoir 36 drawn by capillary action from the ends of the wick 32 towards the central portion of the wick 32 encircled by the heating coil 30.

The liquid reservoir 36 may alternatively include wadding (not shown in FIG. 1) soaked in liquid which encircles the central passage 34 with the ends of the wick 32 abutting the wadding. In other embodiments, the liquid reservoir may comprise a toroidal cavity arranged to be filled with liquid and with the ends of the wick 32 extending into the toroidal cavity.

An air inhalation port 38 is provided at the back end of the atomizer/liquid reservoir portion 16 remote from the end cap 12. The inhalation port 38 may be formed from the cylindrical hollow tube atomizer/liquid reservoir portion 16 or may be formed in an end cap.

In use, a user sucks on the e-cigarette 10. This causes air to be drawn into the e-cigarette 10 via one or more air inlets, such as air inlets 20, and to be drawn through the central passage 34 towards the air inhalation port 38. The change in air pressure which arises is detected by the airflow sensor 26, which generates an electrical signal that is passed to the control electronics 24. In response to the signal, the control electronics 24 activate the heating coil 30, which causes liquid present in the wick 32 to be vaporized creating an aerosol (which may comprise gaseous and liquid components) within the central passage 34. As the user continues to suck on the e-cigarette 10, this aerosol is drawn through the central passage 34 and inhaled by the user. At the same time, the control electronics 24 also activate the LED 18 causing the LED 18 to light up, which is visible via the translucent end cap 12. Activation of the LED may mimic the appearance of a glowing ember at the end of a conventional cigarette. As liquid present in the wick 32 is converted into an aerosol, more liquid is drawn into the wick 32 from the liquid reservoir 36 by capillary action and thus is available to be converted into an aerosol through subsequent activation of the heating coil 30.

Some e-cigarette are intended to be disposable and the electric power in the battery 22 is intended to be sufficient to vaporize the liquid contained within the liquid reservoir 36, after which the e-cigarette 10 is thrown away. In other embodiments, the battery 22 is rechargeable and the liquid reservoir 36 is refillable. In the cases where the liquid reservoir 36 is a toroidal cavity, this may be achieved by refilling the liquid reservoir 36 via a refill port (not shown in FIG. 1). In other embodiments, the atomizer/liquid reservoir portion 16 of the e-cigarette 10 is detachable from the power supply portion 14 and a new atomizer/liquid reservoir portion 16 can be fitted with a new liquid reservoir 36 thereby replenishing the supply of liquid. In some cases, replacing the liquid reservoir 36 may involve replacement of the heating coil 30 and the wick 32 along with the replacement of the liquid reservoir 36. A replaceable unit comprising the atomizer 28 and the liquid reservoir 36 may be referred to as a cartomizer.

The new liquid reservoir may be in the form of a cartridge (not shown in FIG. 1) defining a passage (or multiple passages) through which a user inhales aerosol. In other embodiments, the aerosol may flow around the exterior of the cartridge to the air inhalation port 38.

Of course, in addition to the above description of the structure and function of a typical e-cigarette 10, variations also exist. For example, the LED 18 may be omitted. The airflow sensor 26 may be placed, for example, adjacent to the end cap 12 rather than in the middle of the e-cigarette. The airflow sensor 26 may be replaced by, or supplemented with, a switch which enables a user to activate the e-cigarette manually rather than in response to the detection of a change in airflow or air pressure.

Different types of atomizers may be used. Thus, for example, the atomizer may have a heating coil in a cavity in the interior of a porous body soaked in liquid. In this design, aerosol is generated by evaporating the liquid within the porous body either by activation of the coil heating the porous body or alternatively by the heated air passing over or through the porous body. Alternatively the atomizer may use a piezoelectric atomizer to create an aerosol either in combination or in the absence of a heater.

Figure 2:
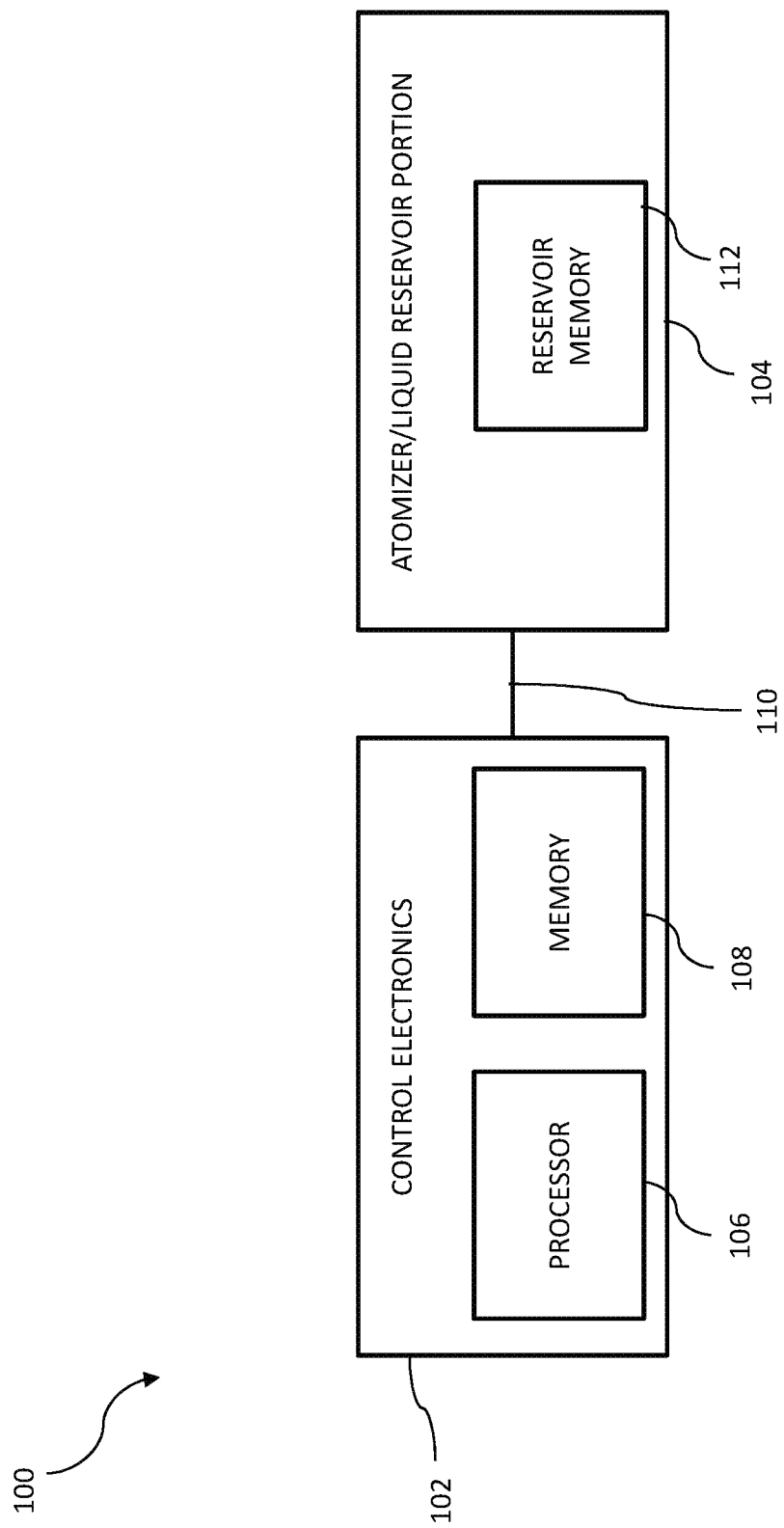
FIG. 2 is a diagram of a system associated with an exemplary e-cigarette.

FIG. 2 is a diagram of a system associated with an exemplary e-cigarette. The system 100 can include control electronics 102 and an atomizer/liquid reservoir portion 104 (also referred to herein as reservoir portion). In some embodiments, the control electronics can be a computing device that includes a processor 106 and memory 108 (e.g., non-transitory computer-readable medium (CRM), database, etc.). The memory 108 can store instructions that are executable by the processor 106 to perform a particular function. The control electronics 102 can be included on power supply portion 14 (FIG. 1) or another support device and/or a collection of support devices, on a mobile device and/or a collection of mobile devices, and/or a combination of the support devices and the mobile devices. For example, the control electronics 102 can be included on a personal computer. The atomizer/liquid reservoir portion 104 can include a reservoir memory 112 (e.g., non-transitory CRM, database, etc.), which can be in communication with the control electronics 102 via a communication link 110, further described herein. In some embodiments, the reservoir memory 112 can store information and/or computer-executable instructions that are specific to the atomizer/liquid reservoir portion 104. For example, the reservoir memory 112 can store information specific to characteristics associated with a liquid stored in a reservoir of the atomizer/liquid reservoir portion 104, a type of atomizer (e.g., coil), a type of wick, a serial number associated with the atomizer reservoir portion 104, etc., as further discussed herein. Further aspects associated with the control electronics 102 and/or the reservoir portion 104 are discussed herein.

Figure 3:
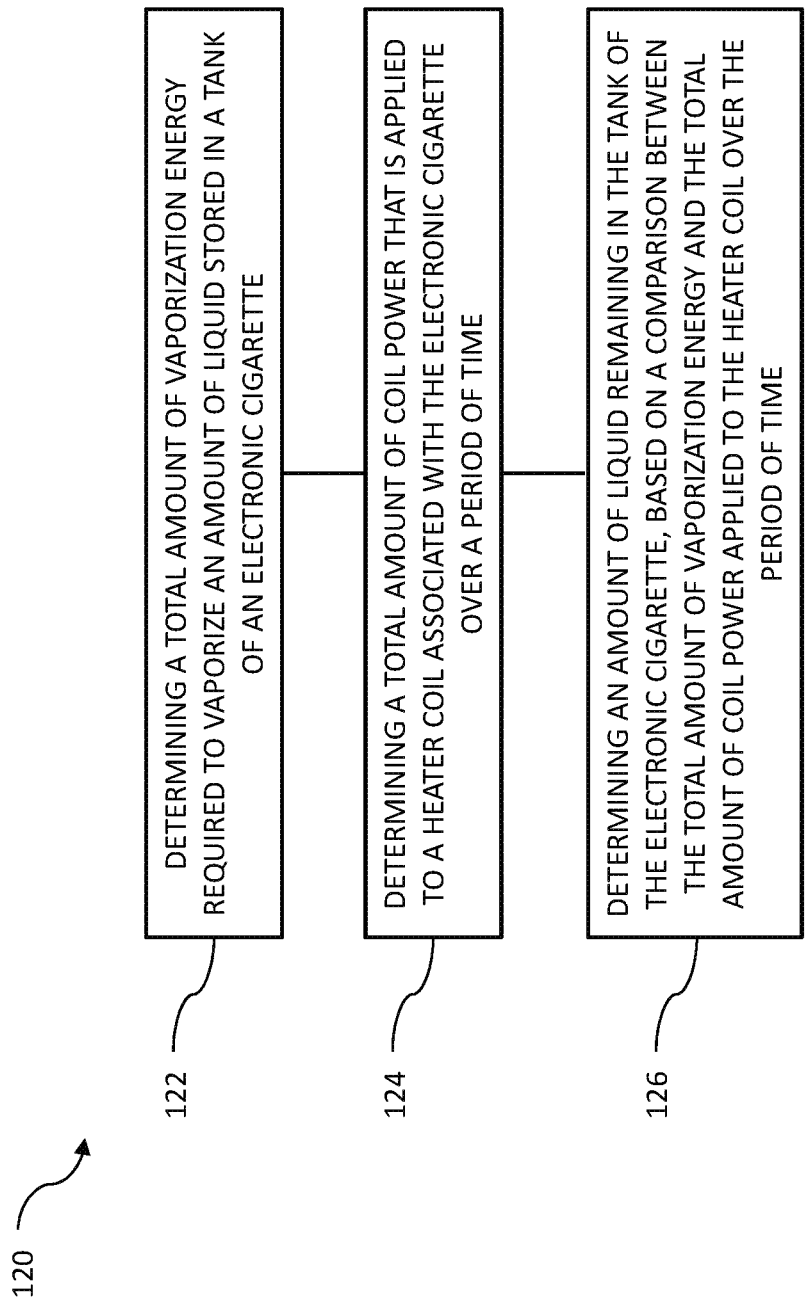
FIG. 3 is a method flow diagram that depicts a method for controlling an exemplary e-cigarette.

FIG. 3 is a method flow diagram that depicts a method 120 for controlling an exemplary e-cigarette. In some embodiments, the method 120 can include determining, at determining vaporization energy method control block 122, a total amount of vaporization energy required to vaporize an amount of liquid stored in a reservoir that is included in an atomizer/liquid reservoir portion of an e-cigarette. In some embodiments, a reservoir of an e-cigarette can be filled with different types of liquids, which can be vaporized by an atomizer of the e-cigarette. The different types of liquids can have unique characteristics, such as varying nicotine concentrations, varying flavors, and/or varying compositions, physical properties, and/or chemical properties. The different types of liquids can provide different user experiences and certain liquids may be favorable to one user versus another. However, different types of liquids can react differently when they come into contact with an atomizer. In an example, the different types of liquids can have different enthalpies of vaporization, which can be defined as the energy (e.g., enthalpy, vaporization energy) that must be added to the liquid to transform a quantity of the liquid into gas. For instance, a liquid with a higher enthalpy of vaporization may require more energy to be applied to the liquid to cause the liquid to vaporize than a liquid with a comparatively lower enthalpy of vaporization.

As such, while a user may enjoy a particular flavor of liquid with a particular nicotine concentration, the liquid may not be fully atomized when a particular amount of energy is applied to the liquid via an atomizer, due to characteristics associated with the liquid (e.g., higher enthalpy of vaporization). However, a different liquid can be atomized under application of the same amount of energy, as a result of differing characteristics (e.g., a lower enthalpy of vaporization). This can affect a user's experience when using the e-cigarette. For example, while a first e-cigarette filled with a particular liquid may provide a user with a desired puff of vapor; a second e-cigarette, which is the same as the first e-cigarette, but filled with a different liquid, may provide the same user an undesirable puff due to inadequate atomization of the liquid. Embodiments of the present disclosure can provide for a uniform quality of puff by taking into account an amount of vaporization energy associated with a particular liquid and other factors discussed herein.

In some embodiments, the method can include determining a total amount of vaporization energy for different types of liquids. In an example, a type of liquid and/or an amount of liquid stored in a reservoir of the e-cigarette and/or characteristics of the liquid can be stored on the reservoir memory 112 (FIG. 2). In some embodiments, the total amount of vaporization energy associated with the liquid in the reservoir can be stored on the reservoir memory 112. The total amount of vaporization energy can be defined as a total amount of energy that would need to be applied to an atomizer (e.g., coil) to cause a particular amount of the liquid stored in the reservoir (e.g., all of the liquid) to be vaporized. In some embodiments, the amount of energy can be that required for a particular percentage of the liquid to be vaporized. For example, the total amount of vaporization energy can be the total amount of energy that would need to be applied to an atomizer to cause 90% of the liquid stored in a 1 milliliter reservoir to be vaporized.

With further reference to FIG. 3, in some embodiments, the method 120 can include determining, at determining coil power method control block 124, a total amount of atomizer power that is delivered to an atomizer associated with the e-cigarette over a period of time. In some embodiments, the total amount of atomizer power that is delivered to the atomizer associated with the e-cigarette over the period of time can be equivalent to an energy delivered to the atomizer. In some embodiments, a power sensor can measure a total amount of power applied to the atomizer over a particular time. In some embodiments, a current sensor can measure a total amount of current applied to the atomizer over a particular time, from which an atomizer power can be determined. In some embodiments, a voltage sensor can measure a total amount of current applied to the atomizer over a particular time, from which an atomizer power can be determined.

In some embodiments, an amount of atomizer power that is delivered to the atomizer can be varied, in accordance with an airflow traveling through the e-cigarette. For example, as a user sucks on the e-cigarette, the airflow drawn through the e-cigarette can be varied depending on how hard the user sucks. In some prior methods, a constant amount of power can be delivered to an atomizer. However, as a result, a same amount of liquid can be vaporized regardless of how hard the user sucks. This can lead to varying qualities of puffs, since when a user sucks with more force, a greater amount of air is drawn through the e-cigarette while the same amount of vapor is generated; and when a user sucks with less force, a lesser amount of air is drawn through the e-cigarette while the same amount of vapor is generated. Embodiments of the present disclosure can vary the atomizer power delivered to the atomizer, which results in a varying amount of liquid being delivered to the atomizer via capillary action. For example, as a user sucks on the e-cigarette with more force, more power is supplied to the atomizer, thus increasing an amount of liquid that is drawn to the atomizer via capillary action. In contrast, as a user sucks on the e-cigarette with less force, less power is supplied to the atomizer, thus decreasing an amount of liquid that is drawn to the atomizer via capillary effect. In some embodiments, the e-cigarette can include a mass airflow sensor, which can determine a mass flow rate of air drawn through the e-cigarette. In some embodiments, as an amount of airflow drawn through the e-cigarette increases, so can an amount of liquid that is drawn to the atomizer, as discussed above. In some embodiments, instructions can be included on the control electronics 26 (FIG. 1), which can be executed by a processor to vary an sensor representative of airflow. By doing so, embodiments of the present disclosure can ensure that a proper amount of power is applied to the atomizer to cause vaporization of the liquid drawn to the atomizer. In some embodiments, a linear or non-linear correlation can exist between the amount of airflow drawn through the e-cigarette (e.g., a mass flow rate of air passing over the mass airflow sensor represented via a signal generated by the mass airflow sensor) and the amount of power provided to the atomizer.

In some embodiments, the method 120 can include determining 126, at determining liquid amount method control block 126, an amount of liquid remaining in the reservoir of the e-cigarette, based on a comparison between the total amount of vaporization energy and the total amount of atomizer power delivered to the atomizer over the period of time. In an example, the total amount of vaporization energy associated with the reservoir, which can be stored on the reservoir memory 112 (FIG. 2), can be accessed. In an example, instructions stored on memory (e.g., the reservoir memory 112) can be executed to decrement from a particular total amount of vaporization energy. For example, as a user puffs on the e-cigarette, the amount of atomizer power delivered to the atomizer can increase. As such, a decrementing counter can be employed to subtract the amount of atomizer power that has been delivered to the atomizer over the period of time from the total amount of vaporization energy required to vaporize the amount of liquid stored in the reservoir of the e-cigarette. The decrementing counter can count down (e.g., subtract the amount of atomizer power delivered) until a particular threshold energy level is met. For example, the threshold can be zero in some embodiments, or some energy level above zero (e.g., 10% of the total amount of vaporization energy). In some embodiments, the ratio between the particular threshold energy level at a time $t_1$ and the total amount of vaporization energy at a time to can be linearly or non-linearly correlated to a ratio between the remaining amount of liquid in the reservoir at time $t_1$ and the total amount of liquid contained in the reservoir at time to. Accordingly, the amount of liquid remaining in the reservoir of the e-cigarette can be determined, based on the comparison between the total amount of vaporization energy and the total amount of atomizer power delivered to the atomizer over the period of time.

In some embodiments, an incrementing counter can be employed to add the amount of atomizer power that has been delivered to the atomizer over the period of time. The incrementing counter can count up (e.g., add the amount of atomizer power delivered) until a particular threshold energy level is met. For example, the threshold can be the total amount of vaporization energy required to vaporize the amount of liquid stored in the reservoir, and/or some energy level below the total amount of vaporization energy (e.g., 90% of the total amount of vaporization energy).

In contrast to some methods that deliver steady state power to an atomizer, embodiments of the present disclosure are capable of delivering a variable power to the atomizer. Methods that deliver a steady state power to the atomizer can use a total amount of puffs, a time associated with each puff, and/or an average time associated with each puff to calculate how much liquid remains in a reservoir. However, because embodiments of the present disclosure can vary the amount of power delivered to the atomizer based on how hard a user sucks on the e-cigarette, a varying amount of liquid can be used for each puff and/or over a time frame of each puff. Accordingly, a determination of how much liquid remains in the reservoir based solely on the total amount of puffs, the time associated with each puff, and/or an average time associated with each puff may not be accurate in a system that can deliver a varying amount of power to the atomizer. Embodiments of the present disclosure can provide an accurate determination of the amount of liquid that remains in the reservoir, regardless of whether the amount of power supplied to the atomizer is steady state or is varied.

In some embodiments, as discussed above, the method can include determining that the amount of liquid remaining in the reservoir of the e-cigarette is less than a particular threshold, based on the comparison between the total amount of vaporization energy and the total amount of atomizer power delivered to the atomizer over the period of time. In some embodiments, the method can include causing an indication to be provided via a user interface in response to the determination that the amount of liquid remaining in the reservoir of the e-cigarette is less than the particular threshold. In some embodiments, the indication can be an auditory, visual, and/or tactile indication. An auditory indication can include, for example, a sound, such as a tone, beep, etc. A visual indication can include, for example, activation of a light (e.g., light emitting diode (LED)), which causes the light to blink or remain on. A tactile indication can include, for example, a vibration generated by a vibration element (e.g., motor).

In some embodiments, the method can include causing an amount of power delivered to the atomizer to be limited in response to the determination that the amount of liquid remaining in the reservoir of the e-cigarette is less than the particular threshold. In an example, instructions can be executed by a processor, causing power to the atomizer to be shut off, such that the atomizer does not turn on when a user sucks on the device and/or an airflow is not detected via a signal generated by the mass airflow sensor.

FIG. 4A is a diagram of a system 130 for controlling an operation of an exemplary e-cigarette. The system 130 can include a data store 132, a controlling operation system 134, and/or a number of engines. The controlling operation system 134 can be in communication with the data store 132. The controlling operation system 134 can include a number of engines (e.g., determining vaporization energy engine 136, determining power engine 138, delivering engine 140, determining liquid amount engine 142, etc.). The controlling operation system 134 can include additional or fewer engines than illustrated to perform the various functions described herein. The number of engines can include a combination of hardware and programming to perform a number of functions described herein (e.g., receiving, determining, etc.). Each of the engines can include hardware or a combination of hardware and programming designated or designed to execute a module (e.g., a particular module). The programming can include instructions (e.g., software, firmware, etc.) stored in a memory resource (e.g., computer-readable medium) as well as a hard-wired program (e.g., logic).

The controlling operation system 134 can include a computing device analogous to that discussed herein and with respect to FIG. 4B. In some embodiments, the computing device can include a digital display such as a graphical user interface (GUI), which is suitable for the display of electronic data. A user interface can include hardware components and/or computer-readable instruction components. For instance, hardware components can include input components (e.g., a mouse, a touchscreen, a keyboard, dials and buttons, etc.) and/or output components (e.g., a display, vibration generating devices, speakers, etc.). An example user interface can include a GUI, which can digitally represent data associated with controlling an operation of an e-cigarette.

The determining vaporization energy engine 136 can include hardware and/or a combination of hardware and programming to determine a total amount of vaporization energy required to vaporize an amount of liquid stored in a reservoir of an e-cigarette. In some embodiments, as discussed herein, the amount of vaporization energy required to vaporize the amount of liquid stored in the reservoir can be stored on a memory disposed on an atomizer/liquid reservoir portion of the e-cigarette (e.g., data store 132). In some embodiments, upon connection of a power supply portion of the e-cigarette with the memory portion of the e-cigarette, a processor included in control electronics can read the memory and determine the total amount of vaporization energy, based on data stored on the memory. Alternatively, the processor included in the control electronics can read the memory and determine the amount of vaporization energy upon a first puff made by a user.

The determining power engine 138 can include hardware and/or a combination of hardware and programming to determine an amount of power to deliver to an atomizer of the e-cigarette, based on received data. As previously discussed, the amount of power delivered to the atomizer can be variable. In some embodiments, the received data can be generated by a mass airflow sensor, as discussed herein. Accordingly, as a mass airflow increases, an increased power can be provided to the atomizer; and/or as the mass airflow decreases, a decreased power can be provided to the atomizer. In some embodiments, the received data can be received from a variable switch. For example, the e-cigarette can include a variable switch, which can be operated by a user. The variable switch can be a variable power switch, in some embodiments, which can be a physical switch and/or provided via a graphical user interface. The variable switch can be configured to vary an amount of power delivered to the atomizer. By varying the amount of power delivered to the atomizer, a user can adjust an amount of vapor that is produced upon activation of the atomizer, thus allowing the user to configure the e-cigarette to their personal preferences.

In some embodiments, the received data can be indicative of a characteristic associated with the e-cigarette. The received data can be generated, in some embodiments, when the processor reads the memory disposed on the atomizer/liquid reservoir portion of the e-cigarette. For example, data can be read by the processor and the characteristic associated with the e-cigarette can be determined.

The delivering engine 140 can include hardware and/or a combination of hardware and programming to cause the determined amount of power to be delivered to the atomizer. In some embodiments, the processor can execute instructions stored on a memory included in control electronics associated with a power supply portion 14 (FIG. 1) of the e-cigarette and/or instructions stored on a memory associated with the reservoir portion of the e-cigarette (e.g., physically disposed on the reservoir portion), causing the determined amount of power to be delivered to the atomizer.

The determining liquid amount engine 142 can include hardware and/or a combination of hardware and programming to determine an amount of liquid remaining in the reservoir of the e-cigarette, based on a comparison between the total amount of vaporization energy and the total amount of power delivered to the atomizer over a particular period of time. In some embodiments, a power sensor can measure a total amount of power applied to the atomizer over a particular time. In some embodiments, a current sensor can measure a total amount of current applied to the atomizer over a particular time, from which an atomizer power can be determined. In some embodiments, a voltage sensor can measure a total amount of current applied to the atomizer over a particular time, from which an atomizer power can be determined.

FIG. 4B depicts a diagram of an example of a computing device 150 for controlling an atomizer of an e-cigarette, according to various embodiments of the present disclosure. The computing device 150 can utilize software, hardware, firmware, and/or logic to perform a number of functions described herein.

The computing device 150 can be a combination of hardware and instructions 158 for controlling an atomizer of an e-cigarette. The hardware, for example, can include a processing resource 152 and/or a memory resource 154 (e.g., computer-readable medium (CRM), database, etc.). A processing resource 152, as used herein, can include a number of processors capable of executing instructions 158 stored by the memory resource 154. Processing resource 152 can be integrated in a single device or distributed across multiple devices. The instructions 158 (e.g., computer-readable instructions (CRI)) can include instructions 158 stored on the memory resource 154 and executable by the processing resource 152 to implement a desired function (e.g., determine an amount of power to deliver to the atomizer, based on the characteristic and the flow rate of air, etc.).

The memory resource 154 can be in communication with the processing resource 152. The memory resource 154, as used herein, can include a number of memory components capable of storing instructions 158 that can be executed by the processing resource 152. Such memory resource 154 can be a non-transitory CRM. Memory resource 154 can be integrated in a single device or distributed across multiple devices. Further, memory resource 154 can be fully or partially integrated in the same device as processing resource 152 or it can be separate but accessible to that device and processing resource 152. Thus, it is noted that the computing device 150 can be implemented on a support device and/or a collection of support devices, on a mobile device and/or a collection of mobile devices, and/or a combination of the support devices and the mobile devices. In some embodiments, one or more instructions included on the memory resource 154 can be updated and/or new instructions can be loaded on the memory.

The memory resource 154 can be in communication with the processing resource 152 via a communication link 156 (e.g., path). The communication link 156 can be local or remote to a computing device associated with the processing resource 152. Examples of a local communication link 156 can include an electronic bus internal to a computing device where the memory resource 154 is one of a volatile, non-volatile, fixed, and/or removable storage medium in communication with the processing resource 152 via the electronic bus.

Link 156 (e.g., local, wide area, regional, or global network) represents a cable, wireless, fiber optic, or remote connection via a telecommunication link, an infrared link, a radio frequency link, and/or other connectors or systems that provide electronic communication. That is, the link 156 can, for example, include a link to an intranet, the Internet, or a combination of both, among other communication interfaces. The link 156 can also include intermediate proxies, for example, an intermediate proxy server (not shown), routers, switches, load balancers, and the like.

The memory resource 154 can include a number of modules such as a determine characteristic module 160, determine flow rate module 162, and/or determine power module 164. The number of modules 160, 162, 164 can include CRI that when executed by the processing resource 152 can perform a number of functions. The number of modules 160, 162, 164 can be sub-modules of other modules. For example, the determine flow rate module 162 and the determine power module 164 can be sub-modules and/or contained within the same computing device 150. In another example, the number of modules 160, 162, 164 can comprise individual modules at separate and distinct locations (e.g., CRM, etc.).

Each of the number of modules 160, 162, 164 can include instructions that when executed by the processing resource 152 can function as a corresponding engine, as described herein. For example, the determine power module 164 can include CRI that when executed by the processing resource 152 can function as the determining power engine 138.

In some embodiments, the determine characteristic module 160 can include CRI that when executed by the processing resource determine a characteristic associated with the e-cigarette based on data stored on a memory of a reservoir portion of the e-cigarette. In some embodiments, the CRI can be executable by the processing resource to determine a resistance characteristic associated with a coil in the atomizer from the data stored on the memory. In some embodiments, the resistance characteristic can include a resistance of the coil included in the atomizer of the e-cigarette. In some embodiments, the resistance of the coil can have an effect on a desired amount of power provided to the coil. For example, instructions can be executed to deliver an increased power with an increasing resistance of the coil. Alternatively, instructions can be executed to deliver a decreased power with an increasing resistance of the coil. Accordingly, a different amount of power can be delivered to the coil based on the resistance of the coil. In some embodiments, a current with which the coil is driven at can be adjusted, based on the resistance of the coil. For example, a 1 ohm coil can be driven at a greater current or lesser current than what a 1.1 ohm coil is driven at. In some embodiments, instructions can be executed to deliver an increased current to the coil with an increasing resistance of the coil. Alternatively, instructions can be executed to deliver a decreased current to the coil with an increasing resistance of the coil.

In some embodiments, the CRI can be executed to determine an expiration characteristic associated with the reservoir portion from the data stored on the memory. The expiration characteristic can include a time period, in some embodiments. For example, the time period can be a particular date at which use of the reservoir portion is no longer recommended and/or no longer permitted. In some embodiments, the expiration date can be determined based on a particular manufacturing date associated with the reservoir portion, which can be stored in the memory. For example, the expiration date can be 6 months, 1 year, 2 years, etc. after the reservoir portion was manufactured. In some embodiments, CRI can be executed to limit an amount of power delivered to the atomizer base on expiration of the time period. For example, the amount of power delivered to the atomizer can be limited such that no power is provided to the atomizer and the associated coil (e.g., heating element) such that the atomizer is no longer activated when a user sucks on the e-cigarette.

In some embodiments, the CRI can be executed to determine a correction factor characteristic associated with a liquid stored in the reservoir portion using the data stored on the memory. In some embodiments, as discussed herein, different liquids included in the reservoir portion can have different enthalpies of vaporization. Accordingly, a different amount of power may need to be applied to the atomizer to cause different liquids to be vaporized. In some embodiments, the correction factor characteristic can include a correction factor associated with the liquid in the reservoir portion. In some embodiments, the correction factor can be a numerical value that is multiplied by an amount of power that is provided to the coil, based on a type of liquid in the reservoir portion. In some embodiments, the power delivered to the coil can be held constant, but can be delivered to the coil over a greater period of time, to increase an energy supplied to the liquid via the coil.

In some embodiments, the correction factor can be determined experimentally and programmed into the memory of the reservoir portion. For example, the correction factor can be determined experimentally and programmed into the memory of the reservoir portion upon production of the device. In some embodiments, a processor included on the power supply portion can read the memory and the correction factor stored on the memory of the reservoir portion. The processor can execute instructions to vary an amount of power supplied to the atomizer, based on the correction factor.

In some embodiments, the CRI can be executed to determine a total amount of power delivered to the atomizer over a period of time. In an example, the coil associated with the atomizer can have a defined lifespan. For instance, after a defined amount of power has been delivered to the coil over a period of time, the coil can degrade and/or burn out. Accordingly, upon reaching a threshold amount of power that has been delivered to the atomizer, the power delivered to the coil can be limited. In some embodiments, an amount of power delivered to the atomizer can be limited, based on the total amount of power delivered to the atomizer over the period of time. In some embodiments, an amount of power delivered to the atomizer can be limited, based on the total amount of power delivered to the atomizer over the period of time exceeding a threshold. For example, the power delivered to the coil can be limited such that no power is provided to the atomizer and the coil associated with the atomizer is no longer activated when a user sucks on the e-cigarette.

In some embodiments, the CRI can be executed to determine a type of wick included in the atomizer from the data stored on the memory. In some embodiments, a type of wick included in the atomizer can have an effect on an efficiency at which liquid is vaporized via the atomizer. Accordingly, in some embodiments, based on the type of wick included in the atomizer, an amount of power supplied to the coil of the atomizer can be varied.

In some embodiments, the CRI can be executed to determine a serial number of a battery associated with a power supply portion of the e-cigarette. In an example, the serial number of the battery associated with the power supply portion of the e-cigarette can be checked against a stored table of serial numbers located in the memory of the reservoir portion to confirm that the power supply portion of the e-cigarette is authorized to function with the reservoir portion. In some embodiments, if the serial number of the power supply portion is determined to not be authorized to function with the reservoir portion, the atomizer can be disabled by preventing power from being provided to the atomizer. This can protect against use of counterfeited power supply portions or use of power supply portions that are not authorized for use with the reservoir portion.

In some embodiments, the memory of the reservoir portion can store a serial number and/or batch code associated with a particular manufacturing batch in which the reservoir portion was manufactured. Such information can be used for identification purposes of the reservoir portion and/or preventing the use of an unauthorized reservoir portion with a power supply portion. In some embodiments, instructions can be executed on the power supply portion to check the serial number and/or batch codes against a stored table of serial numbers and/or batch codes located in the memory of the battery supply portion to confirm that the reservoir portion of the e-cigarette is authorized to function with the battery supply portion.

In some embodiments, the CRI can be executed to determine a first use date and/or time associated with the reservoir portion of the e-cigarette. In some embodiments, upon first use of an atomizer associated with the reservoir portion of the e-cigarette, the atomizer can begin to oxidize, depending on what type of material (e.g., metal) the atomizer is formed from. In an example, instructions can be executed to limit an amount of power delivered to a coil of the atomizer in response to a time since the first use date and/or time exceeding a threshold time. For example, the power delivered to the coil can be limited such that no power is provided to the atomizer and the coil associated with the atomizer is no longer activated when a user sucks on the e-cigarette.

In some embodiments, the characteristics associated with the coil, such as the resistance characteristic, expiration characteristic, correction factor characteristic, total amount of power delivered to the atomizer over a period of time, type of wick, serial number, batch code, first use date and/or time, etc. can be read by a processor associated with the control electronics included in the power supply portion upon connection of the power supply portion with the reservoir portion and memory included on the reservoir portion. In some embodiments, the characteristics associated with the coil can be read by the processor upon a first puff by a user and/or activation of the atomizer (e.g., when power is supplied to the atomizer for the first time). In some embodiments, a local copy of the memory included on the reservoir portion can be made on the memory included on the power supply portion.

In some embodiments, the determine flow rate module 162 can include CRI that when executed by the processing resource determine a flow rate of air provided to the atomizer, based on a signal received from a mass airflow sensor. In an example, the power supply portion can include a mass airflow sensor, as discussed herein. The mass airflow sensor can generate a signal, which can be read by a processor included on the power supply portion of the e-cig to determine the flow rate of air passing over the mass airflow sensor and ultimately provided to the atomizer.

In some embodiments, the determine power module 164 can include CRI that when executed by the processing resource determine an amount of power to deliver to the atomizer, based on the characteristic and the flow rate of air. As discussed herein, the power delivered to the atomizer can be varied based on the flow rate of air. For example, as the flow rate of air increases, the power delivered to the atomizer can be increased in response to the increase in the flow rate of air. Alternatively, as the flow rate of air decreases, the power delivered to the atomizer can be decreased in response to the decrease in the flow rate of air. In some embodiments, however, the power supplied to the atomizer can be varied, based on the characteristics associated with the e-cigarette, as discussed above. For example, the power can be limited such that no power is provided to the e-cigarette, the power is reduced, the power is increased, and/or the power is maintained at a constant level. In some embodiments, the power supplied to the atomizer based on the characteristics associated with the e-cigarette can have priority over the delivery of power to the atomizer based on the determined flow rate of air. For example, power to the atomizer can be limited even if the flow rate of air increases.

In some embodiments, the CRI can be executed to provide an indication of an amount of liquid remaining in the reservoir, based on the total amount of power delivered to the atomizer over the period of time. As previously discussed, the indication can notify a user that an amount of fluid remaining in the reservoir has decreased to a level below a threshold. The notification can include an auditory, visual, and/or tactile notification in some embodiments.

In some embodiments, the memory included on the reservoir portion of the e-cigarette can include instructions executable by a processor associated with the control electronics to activate a particular mode (e.g., a stealth mode). In an example, the instructions can be executed by the processor to decrease a power to the coil associated with the atomizer. For instance, the power to the coil can be decreased, such that when the atomizer is activated and the user puffs on the e-cigarette, less vapor is produced. In some embodiments, the instructions can be executed by the processor to deactivate one or more lights included on the e-cigarette. For example, where the e-cigarette includes a light disposed on the e-cigarette, which is configured to be activated when a user puffs, executable instructions can be stored on the memory to limit an amount of power provided to the light and/or turn the light off when the user puffs. Accordingly, through activation of the particular mode, a user can puff on the e-cigarette, producing less visible vapor with no other indications (e.g., lights on the e-cigarette being activated) that would indicate the device is being activated.

In summary, one aspect of the present disclosure can include a non-transitory computer readable medium comprising computer executable instructions for controlling an atomizer of an electronic cigarette. The instructions can be executed to determine a characteristic associated with the electronic cigarette based on data stored on a memory of a reservoir portion of the e-cigarette. In various embodiments, the instructions can be executed to determine a flow rate of air provided to the atomizer, based on a signal received from a mass airflow sensor. In various embodiments, the instructions can be executed to determine an amount of power to deliver to the atomizer, based on the characteristic and the flow rate of air.

According to various embodiments, instructions can be executed to deliver an increased amount of power the atomizer in response to an increase in the flow rate of air. According to various embodiments, instructions can be executed to deliver a decreased amount of power to the atomizer in response to a decrease in the flow rate of air. According to various embodiments, instructions can be executed to determine a resistance characteristic associated with a coil in the atomizer from the data stored on the memory, the resistance characteristic including a resistance of the coil; and determine the amount of power to deliver to the atomizer based on the resistance characteristic associated with the coil. According to various embodiments, instructions can be executed to determine a total amount of power delivered to the atomizer over a period of time. According to various embodiments, instructions can be executed to limit an amount of power delivered to the atomizer, based on the total amount of power delivered to the atomizer over the period of time exceeding a threshold. According to various embodiments, instructions can be executed to provide an indication of an amount of liquid remaining in the reservoir, based on the total amount of power delivered to the atomizer over the period of time. According to various embodiments, instructions can be executed to determine an expiration characteristic associated with the reservoir portion from the data stored on the memory, the expiration characteristic including a time period; and limit an amount of power delivered to the atomizer base on expiration of the time period. According to various embodiments, instructions can be executed to determine a correction factor characteristic associated with a liquid stored in the reservoir portion from the data stored on the memory, the correction factor characteristic including a correction factor associated with the liquid, wherein the determined amount of power is determined based on the correction factor In summary, one aspect of the present disclosure can include a method for controlling an operation of an electronic cigarette. The method can include determining a total amount of vaporization energy required to vaporize an amount of liquid stored in a reservoir of an electronic cigarette. The method can include determining a total amount of atomizer power that is delivered to an atomizer associated with the electronic cigarette over a period of time. The method can include determining an amount of liquid remaining in the reservoir of the electronic cigarette, based on a comparison between the total amount of vaporization energy and the total amount of atomizer power delivered to the atomizer over the period of time.

According to various embodiments, the method can include determining a total amount of vaporization energy for different types of liquids. According to various embodiments, the method can include determining that the amount of liquid remaining in the reservoir of the electronic cigarette is less than a particular threshold, based on the comparison between the total amount of vaporization energy and the total amount of atomizer power delivered to the atomizer over the period of time. According to various embodiments, the method can include causing an indication to be provided via a user interface in response to the determination that the amount of liquid remaining in the reservoir of the electronic cigarette is less than the particular threshold. According to various embodiments, the method can include causing an amount of power delivered to the atomizer to be limited in response to the determination that the amount of liquid remaining in the reservoir of the electronic cigarette is less than the particular threshold.

In summary, one aspect of the present disclosure can include a system for controlling an operation of an electronic cigarette. The system can include a processor and a non-transitory computer readable medium comprising computer executable instructions, the instructions executable by the processor. The instructions can be executed to determine a total amount of vaporization energy required to vaporize an amount of liquid stored in a reservoir of an electronic cigarette. The instructions can be executed to determine an amount of power to deliver to an atomizer of the electronic cigarette based on received data. The instructions can be executed to cause the determined amount of power to be delivered to the atomizer. The instructions can be executed to determine an amount of liquid remaining in the reservoir of the electronic cigarette, based on a comparison between the total amount of vaporization energy and the total amount of power delivered to the atomizer over a particular period of time.

According to various embodiments, the system can include instructions executable to determine a variable amount of power to be delivered to the atomizer. According to various embodiments, the system can include instructions executable to receive the received signal from a variable switch. According to various embodiments, the system can include instructions executable to receive a received signal that is indicative of a characteristic associated with the e-cigarette.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the appended claims.

LIST OF REFERENCE SIGNS 10 electronic smoking device
12 end cap
14 power supply portion
16 atomizer/liquid reservoir portion
18 light-emitting diode (LED)
20 air inlets
22 battery
24 control electronics
26 airflow sensor
28 atomizer
30 heating coil
32 wick
34 central passage
36 liquid reservoir
38 air inhalation port
100 system
102 control electronics
104 reservoir portion
106 processor
108 memory
110 communication link
112 reservoir memory
120 method
122 determining vaporization energy method control block
124 determining coil power method control block
126 determining liquid amount method control block
130 system
132 data store
134 controlling operation system
136 determining vaporization energy engine
138 determining power engine
140 delivery engine
142 determining liquid amount engine
150 computing device
152 processing resource
154 memory resource
156 communication link
158 instructions
160 characteristic module
162 determine flow rate module
164 determine power module

The invention claimed is:
1. An electronic cigarette, comprising:
an atomizer;
a mass airflow sensor; and
a memory disposed on one of a first and second removable reservoir portion of the electronic cigarette, the memory including a non-transitory computer readable medium comprising computer executable instructions for controlling the atomizer of the electronic cigarette, the instructions executable by a processor to:

determine a first vaporization energy associated with a first liquid stored in the first removable reservoir portion;

determine a second vaporization energy associated with a second liquid stored in one of the first and second removable reservoir portion, when the second removable reservoir portion is connected to the electronic cigarette in place of the first removable reservoir portion, wherein the first vaporization energy is different than the second vaporization energy;

determine an amount of power to deliver to the atomizer over a period of time, based on either the first vaporization energy or the second vaporization energy and a type of wick associated with the atomizer, dependent on the particular reservoir portion connected to the atomizer, wherein the first vaporization energy or the second vaporization energy and information that identifies the type of wick is stored on the memory disposed on the particular reservoir portion connected to the atomizer; and determine an amount of liquid remaining in the particular removable reservoir portion, based on a comparison between the total amount of power delivered to the atomizer and the total amount of vaporization energy associated with the first liquid or the second liquid, wherein the determination of the amount of liquid remaining in the removable reservoir portion is calibrated to the type of wick associated with the atomizer, as identified by the type of wick stored on the memory.

2. The electronic cigarette of claim 1, wherein the first liquid is a different type of liquid than the second liquid.

3. The electronic cigarette of claim 1, wherein a type of the first liquid is stored on the memory disposed on the removable reservoir portion of the electronic cigarette.

4. The electronic cigarette of claim 3, wherein a type of the second liquid is stored on a memory disposed on the second removable reservoir portion of the electronic cigarette.

5. The electronic cigarette of claim 1, wherein the memory disposed on the removable reservoir portion of the electronic cigarette includes information that identifies the type of wick associated with the atomizer.

6. The electronic cigarette of claim 1, wherein the memory disposed on the removable reservoir portion of the electronic cigarette includes a serial number associated with the reservoir portion.

7. The electronic cigarette of claim 1, wherein a total amount of vaporization energy provided to the atomizer of the electronic cigarette is stored on the memory disposed on the particular removable reservoir portion connected to the electronic cigarette.

8. The electronic cigarette of claim 7, further comprising instructions stored on the memory executable to determine an amount of liquid remaining in the removable reservoir portion, based on:

the total amount of vaporization energy provided to the atomizer, the type of wick associated with the atomizer, and the vaporization energy associated with the first liquid or the second liquid.

9. The electronic cigarette of claim 1, wherein the memory disposed on the removable reservoir portion of the electronic cigarette includes a type of atomizer associated with the reservoir portion.

10. The electronic cigarette of claim 9, further comprising instructions stored on the memory executable to determine an amount of power to provide to the atomizer, based on the type of atomizer.

* * * * *